United States Patent
Yao

(10) Patent No.: US 11,024,287 B2
(45) Date of Patent: Jun. 1, 2021

(54) METHOD, DEVICE, AND STORAGE MEDIUM FOR CORRECTING ERROR IN SPEECH RECOGNITION RESULT

(71) Applicant: BAIDU ONLINE NETWORK TECHNOLOGY (BEIJING) CO., LTD., Beijing (CN)

(72) Inventor: Shujie Yao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 201 days.

(21) Appl. No.: 16/321,398

(22) PCT Filed: Jan. 25, 2017

(86) PCT No.: PCT/CN2017/072642
§ 371 (c)(1),
(2) Date: Jan. 28, 2019

(87) PCT Pub. No.: WO2018/018867
PCT Pub. Date: Feb. 1, 2018

(65) Prior Publication Data
US 2020/0184953 A1 Jun. 11, 2020

(30) Foreign Application Priority Data
Jul. 26, 2016 (CN) .......................... 201610597308.8

(51) Int. Cl.
*G10L 15/01* (2013.01)
*G10L 15/02* (2006.01)
(Continued)

(52) U.S. Cl.
CPC .............. *G10L 15/01* (2013.01); *G10L 15/02* (2013.01); *G10L 15/063* (2013.01); *G10L 15/18* (2013.01); *G10L 15/22* (2013.01); *G10L 15/26* (2013.01)

(58) Field of Classification Search
CPC ....... G10L 15/22; G10L 15/18; G10L 15/183; G10L 15/26; G06F 40/232; G06F 40/53; G06F 40/129
See application file for complete search history.

(56) References Cited

U.S. PATENT DOCUMENTS 5,852,801 A * 12/1998 Hon ...................... G10L 15/22
704/244
6,513,005 B1 * 1/2003 Qin ....................... G06K 9/6293
704/231
(Continued)

FOREIGN PATENT DOCUMENTS

| CN | 105302795 A | 2/2016 |
| JP | 2004046106 A | 2/2004 |

(Continued)

OTHER PUBLICATIONS

PCTCN2017072642 English translation of International Search Report dated May 4, 2017, 3 pages.
(Continued)

*Primary Examiner* — Mark Villena
(74) *Attorney, Agent, or Firm* — Lathrop GPM LLP

(57) ABSTRACT

A method, a device, and a storage medium for correcting an error in a speech recognition result are provided. The method includes: performing phonetic notation on a speech recognition result to be corrected, to obtain a pinyin corresponding to the speech recognition result; obtaining one or more candidate texts according to the pinyin, and determining an optimum candidate text from the one or more candidate texts; judging whether the optimum candidate text (Continued)

satisfies a preset condition; and determining the optimum candidate text as a corrected result of the speech recognition result to be corrected in response to satisfying the preset condition.

12 Claims, 3 Drawing Sheets

(51) Int. Cl.
*G10L 15/06* (2013.01)
*G10L 15/18* (2013.01)
*G10L 15/22* (2006.01)
*G10L 15/26* (2006.01)

(56) References Cited

U.S. PATENT DOCUMENTS

| | | | | |
|---|---|---|---|---|
| 7,165,019 | B1* | 1/2007 | Lee | G06F 40/53 |
| | | | | 704/2 |
| 9,484,031 | B2* | 11/2016 | Bao | G06F 40/53 |
| 9,672,817 | B2* | 6/2017 | Yong | G10L 15/08 |
| 2006/0206301 | A1* | 9/2006 | Chang | G06F 40/53 |
| | | | | 704/1 |
| 2008/0270118 | A1* | 10/2008 | Kuo | G06F 40/129 |
| | | | | 704/9 |
| 2009/0024392 | A1* | 1/2009 | Koshinaka | G10L 15/18 |
| | | | | 704/257 |
| 2011/0010174 | A1* | 1/2011 | Longe | G10L 15/24 |
| | | | | 704/235 |
| 2011/0054901 | A1* | 3/2011 | Qin | G06F 40/45 |
| | | | | 704/254 |
| 2011/0307241 | A1* | 12/2011 | Waibel | G10L 15/06 |
| | | | | 704/2 |
| 2015/0088506 | A1* | 3/2015 | Obuchi | G10L 15/08 |
| | | | | 704/236 |

FOREIGN PATENT DOCUMENTS

| | | |
|---|---|---|
| JP | 2011242613 A | 12/2011 |
| JP | 2016091028 A | 5/2016 |
| JP | 2016095399 A | 5/2016 |
| JP | 2016110087 A | 6/2016 |
| JP | 2019507362 A | 3/2019 |

OTHER PUBLICATIONS

PCTCN2017072642 International Search Report and Written Opinion dated May 4, 2017, 13 pages.
Chinese Patent Application No. 201610597308.8 English translation of Office Action dated Oct. 25, 2018, 6 pages.
Chinese Patent Application No. 201610597308.8 Office Action dated Oct. 25, 2018, 6 pages.
Japanese Patent Application No. 2019-524496 Office Action dated Mar. 17, 2020, 6 pages.
Japanese Patent Application No. 2019-524496 English translation of Office Action dated Mar. 17, 2020, 5 pages.

* cited by examiner

METHOD, DEVICE, AND STORAGE MEDIUM FOR CORRECTING ERROR IN SPEECH RECOGNITION RESULT

CROSS REFERENCE TO RELATED APPLICATION

This application is a U.S. national phase of International Application No. PCT/CN2017/072642, which claims priority to Chinese Patent Application No. 201610597308.8 filed on Jul. 26, 2016.

FIELD

The present disclosure relates to a field of speech recognition technologies, and more particularly to a method, a device, and a storage medium for correcting an error in a speech recognition result.

BACKGROUND

Speech recognition is to recognize a speech into a text. Correcting an error in a speech recognition result is an important work in a speech understanding. Limited to accuracy of the speech recognition, the speech recognition results usually have errors, which creates obstruction for the speech understanding, and increases difficulty of the speech understanding. Correcting the error in the speech recognition results can correct some results which are recognized wrongly, thus to improve the accuracy of the speech understanding.

SUMMARY

A method for correcting an error in a speech recognition result provided by first aspect embodiments of the present disclosure, includes: performing phonetic notation on a speech recognition result to be corrected, to obtain a pinyin corresponding to the speech recognition result; obtaining one or more candidate texts according to the pinyin, and determining an optimum candidate text from the one or more candidate texts; judging whether the optimum candidate text satisfies a preset condition; and determining the optimum candidate text as a corrected result of the speech recognition result to be corrected in response to satisfying the preset condition.

Embodiments of the present disclosure further provide a device, including: a processor; a memory configured to store instructions executable by the processor; in which, the processor is configured to: execute the method according to any of the first aspect embodiments.

Embodiments of the present disclosure further provide a non-transitory computer readable storage medium. When instructions in the storage medium are executed by a processor, the processor may be configured to execute: the method according to any of the first aspect embodiments.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure. On the contrary, embodiments of the present disclosure include all changes, modifications, and equivalents falling within the spirit and scope of the appended claims.

Figure 1:
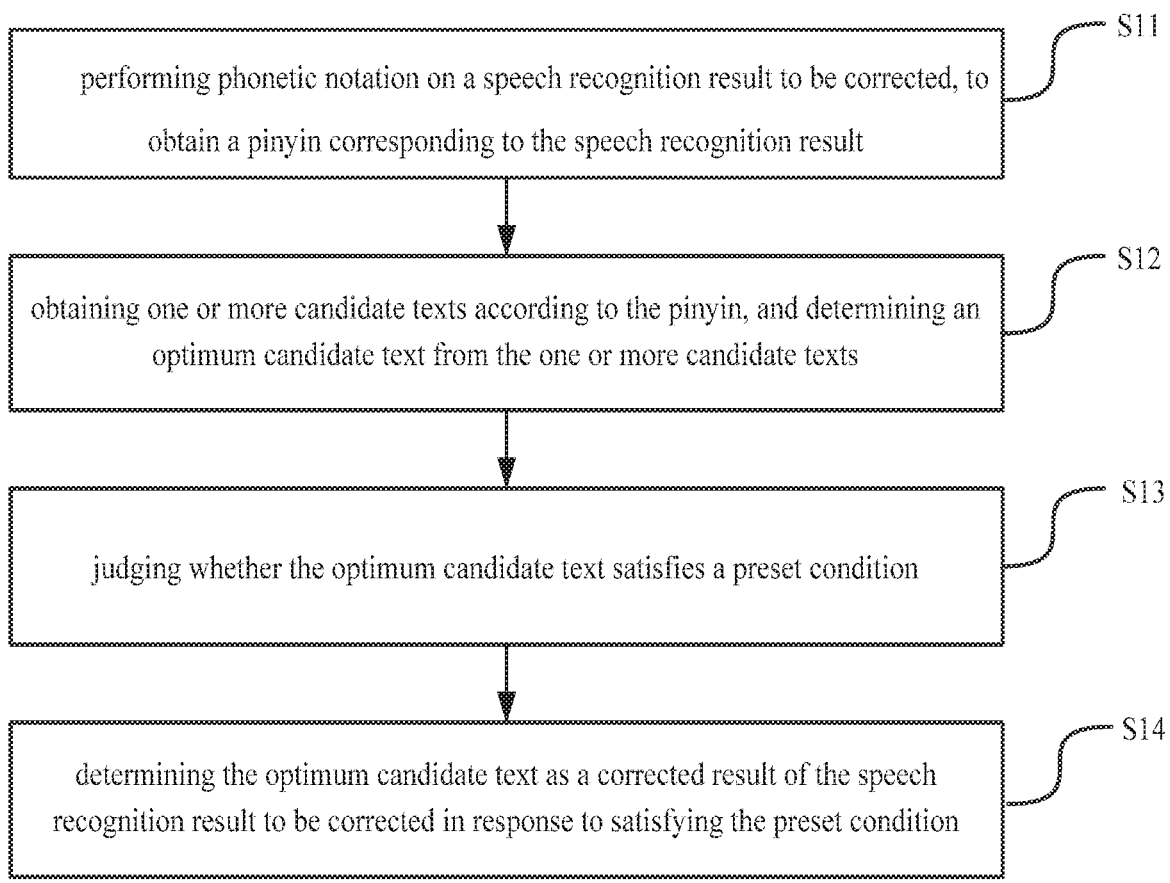
FIG. 1 is a flow chart illustrating a method for correcting an error in a speech recognition result provided in an embodiment of the present disclosure.

FIG. 1 is a flow chart illustrating a method for correcting an error in a speech recognition result provided in an embodiment of the present disclosure.

Referring to FIG. 1, the method of this embodiment includes actions on the following blocks.

In block S11, phonetic notation is performed on a speech recognition result to be corrected, to obtain a pinyin corresponding to the speech recognition result.

After the speech recognition results are obtained by performing speech recognition, results which may have errors in these speech recognition result may be detected based on the technology that has been or will appear in the future. These results which may have errors are taken as the speech recognition results to be corrected.

Since the speech recognition result to be corrected is a text, the phonetic notion on the speech recognition result to be corrected may be realized by employing the phonetic notion for the text, to obtain the pinyin corresponding to the speech recognition result to be corrected.

In detail, the speech recognition result to be corrected may be a sentence combined by Chinese characters, and the corresponding pinyin refers to a toneless Chinese pinyin string.

For example, the speech recognition result to be corrected is "窝要去外溯" (Chinese characters"), and the corresponding pinyin is: woyaoquwaitan.

In block S12, one or more candidate texts are obtained according to the pinyin, and an optimum candidate text is determined from the one or more candidate texts.

The pinyin may be taken as the input of the decoding network, the decoding network is built based on a pronunciation dictionary, and a score of each path in the decoding network is calculated based on a language model, and N (which is settable) paths which have the highest score are chosen, and finally a text corresponding to each path chosen is taken as a candidate text, to obtain N candidate texts.

The optimum candidate text is a text corresponding to a path with the highest score.

In block S13, it is judged whether the optimum candidate text satisfies a preset condition.

The preset condition may be provided based on needs. For example, the optimum candidate text may be compared with a suboptimum candidate text, the optimum candidate text may be compared with the speech recognition result to be corrected, N-gram backspacing times and the like.

Detailed content may be made with reference to following description.

In block S14, the optimum candidate text is determined as a corrected result of the speech recognition result to be corrected in response to satisfying the preset condition.

For another aspect, the speech recognition result to be corrected keeps unchanged when the optimum candidate text does not satisfy the preset condition, that is, no correction.

In this embodiment, by performing the phonetic notation on the speech recognition result to be corrected; obtaining the one or more candidate texts according to the pinyin; and determining the optimum candidate text as the corrected result in response to that the optimum candidate text satisfies the preset condition, it may correct the error in the speech recognition result based on the pinyin input method, and improve the accuracy of the corrected result.

Figure 2:
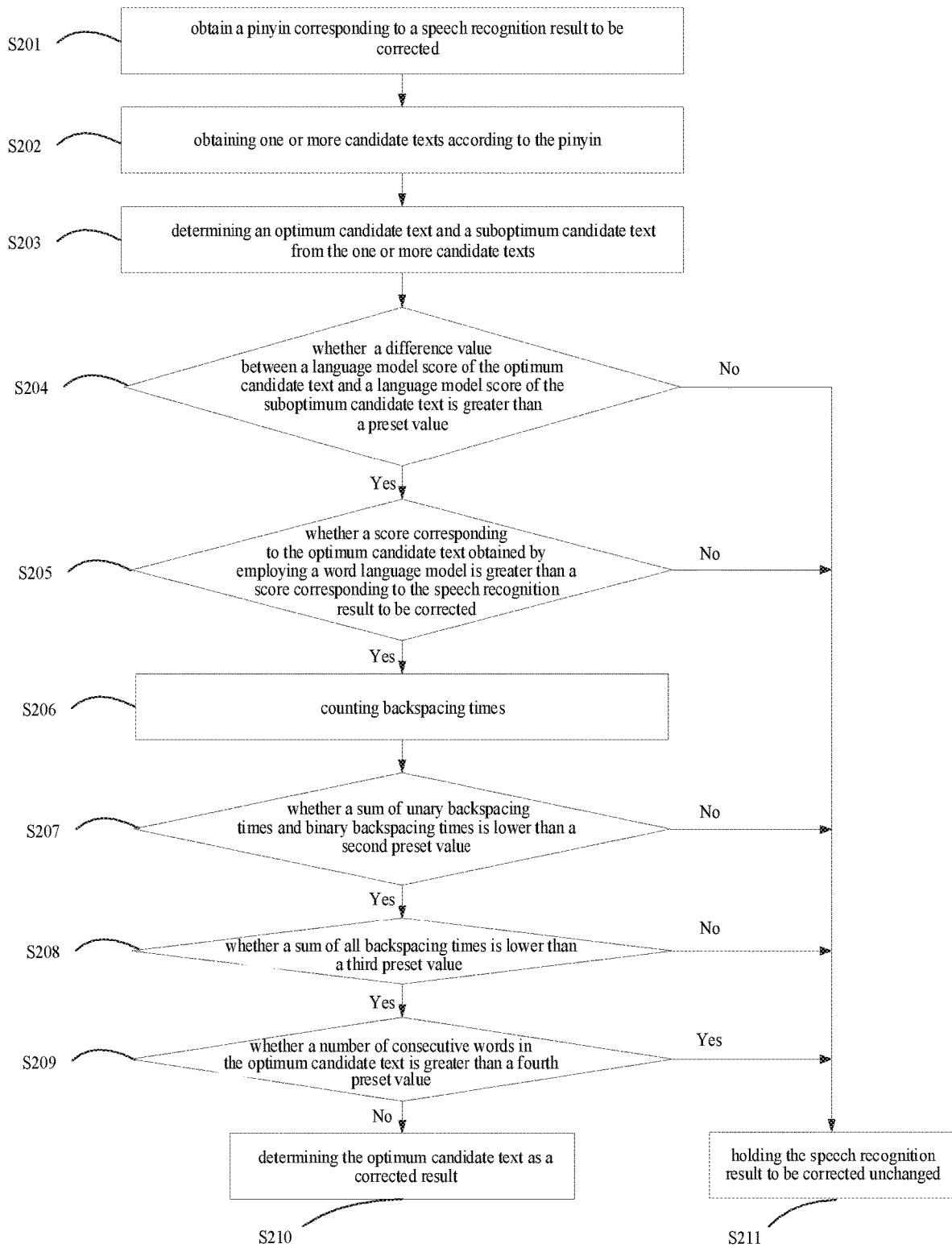
FIG. 2 is a flow chart illustrating a method for correcting an error in a speech recognition result provided in another embodiment of the present disclosure.

FIG. 2 is a flow chart illustrating a method for correcting an error in a speech recognition result provided in another embodiment of the present disclosure.

Referring to FIG. 2, the flow of this embodiment includes actions in the following blocks.

In block S201, phonetic notation is performed on a speech recognition result to be corrected, to obtain a pinyin corresponding to the speech recognition result.

In block S202, a general language model is obtained, a specific language model corresponding to the speech recognition result to be corrected is obtained, and the one or more candidate texts are obtained based on the general language model, the specific language model and the pinyin.

The general language model is a language model employed usually, which is trained based on corpus not distinguishing fields.

In this embodiment, the general language model may be used, and the specific language model is used, too. A training way of the specific language model may be consistent with a training way of the general language model. A difference between both is adopting different training corpora. The specific language model is trained based on corpus of a specific scope. The specific scope may be certain field. For example, in the map field, geographical names collected are taken as the training corpus, thus obtaining a specific language model corresponding to the geographical name. Similarly, a specific language model corresponding to the news field may further be obtained. Further, a specific scope may further be a scope after further subdividing certain specific field. Also taking the map field as an example, a language model may be generated for each corresponding city. In this case, the specific language model includes such as: a specific language model corresponding to Beijing, a specific language model corresponding to Shanghai.

Taking that the specific language model is the specific language model corresponding to the city as an example, the specific language model corresponding to the city may be obtained based on city information input by the user or city information located by GPS (Global Position System).

After the pinyin is obtained by the phonetic notation, the decoding network may be combined based on the pinyin and the pronunciation dictionary.

Figure 3:
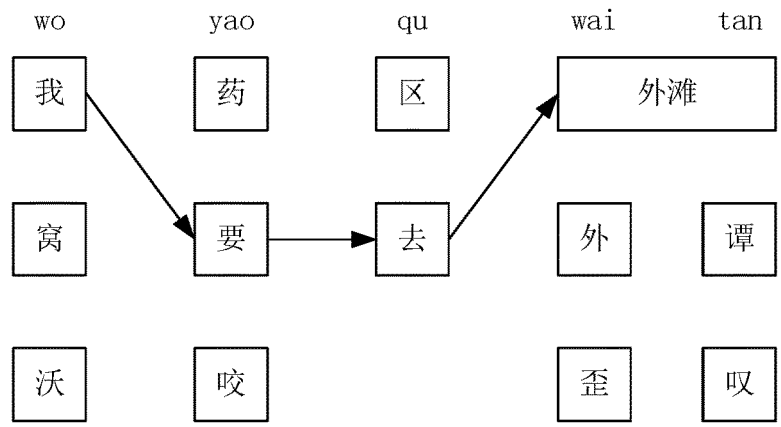
FIG. 3 is a schematic diagram illustrating a decoding network for obtaining a candidate text in embodiments of the present disclosure.

For example, a decoding network is illustrated as FIG. 3 (FIG. 3 only illustrates a path, and other path is similar). Pinyin input in the decoding network is:

woyaoquwai tan

After building the decoding network, the score of each path is calculated based on the language model. Each path includes a plurality of points, and each point corresponds to a word, such that each path corresponds to a candidate text. For example, "我" (a Chinese character, which means "要"), (a Chinese character, which means "want"), "去" (a Chinese character, which means "go") and "外滩" (Chinese characters, which mean a geographical name in China) may combine into a path. "窝" (a Chinese character which means "nest" and has the similar pronounce with Chinese character "我"), "要", "去" and "外滩" may combine into another path. "我", "要", "去", "外" (a Chinese character, which means "outside") and "谭" (a Chinese character, which means "surname". "外" and "谭" have the similar pronounce with Chinese character "外滩") may further combine into another path. The score of each path is obtained based on the language model.

When the score of each path is calculated, it may be obtained based on multiplying the scores of n-gram word sequences contained in this path.

In this embodiment, the score of each n-gram word sequence may be obtained according to performing a weighted summation on a probability value determined by the general language model and a probability value determined by the specific language model.

Taking 2-gram as an example, for the 2-gram word sequence combined by "去" and "外滩", a score of the word-sequence, score (去,外滩) is calculated by $$\text{score}(去,外滩)=\alpha * P_{base}(去,外滩)+(1-\alpha)*P_{city21}(去,外滩),$$

$P_{base}(去,外滩)$ is a probability value obtained based on the general language model, $P_{city21}(去,外滩)$ is a probability value obtained based on the specific language model, and $\alpha$ is a weighted value which may be set to be greater than 0 and lower than 1.

After calculating the score of each path, the preset number (which may be settable) of paths may be selected based on an order of the scores from high to low, and the texts corresponding to the paths selected are taken as the candidate texts.

In block S203, the optimum candidate text and the suboptimum candidate text are determined from the one or more candidate texts.

The optimum candidate text refers to a text corresponding to a path with the highest score, and the suboptimum candidate text refers to a text corresponding to a path with the second highest score.

For example, supposing the path combined by "我", "要", "去" and "外滩" gets the highest score "我要去外滩" is the optimum candidate text. Supposing the path combined by "我", "要", "去", "外" and "谭" gets the second highest score, "我要去外谭" is the suboptimum candidate text.

In block S204, a difference value between a language model score of the optimum candidate text and a language model score of the suboptimum candidate text is calculated. It is determined whether the difference value is greater than a first preset value. If yes, and block S205 is executed; otherwise, block S211 is executed.

The score of the above language model (i.e., the language model score) is obtained based on the decoding network in the above step, which is the score obtained according to performing weighted summation on the generic language model and the specific language model.

The first preset value above may be selected as 150.

In block S205, a word language model is obtained, the optimum candidate text and the speech recognition result to be corrected are marked respectively based on the word language model, and it is judged whether a score corresponding to the optimum candidate text is greater than a score corresponding to the speech recognition result to be corrected. If yes, block S206 is executed, and otherwise, block S211 is executed.

The word language model is generated after taking the word as the training corpus for training. An amount of words may be collected in advance, and then the word language model is generated based on a training algorithm of the language model.

After obtaining the word language model, the above two texts (the optimum candidate text and the speech recognition result to be corrected) may be respectively marked based on the word language model, to obtain scores respectively corresponding to the two texts.

In block S206, the optimum candidate text is marked by using a phase language model, and backspacing times of each n-gram are counted.

It should be noted that, unless otherwise specified in the present disclosure, the language model refers to the phase language model.

Further, the phase language model in this step may be the general language model or the specific language model above.

The language model is usually built based on the n-gram. In building, in order to solve the problem of data sparsity, in some scene, a backspacing algorithm needs to be used to replace a probability of occurrence of high-order words with a probability of occurrence of low-order words.

For example, when the score of the language model is calculated, if a previous conditional probability is p(w3|w2w1w0), and this is a 4-gram. When the next word w4 appears, and w1w2w3w4 in the language model, that is, the 4-gram, does not appear to be backspaced, and replacing with p(w4|w3w2) is a unary backspacing. If w2w3w4 does not further appear to be backspaced, replacing with p(w4|w3) is a binary backspacing. Therefore, n-gram backspacing here refers to how many grams are backspaced compared to the last backspacing.

In block S207, it is determined whether a sum of 1-gram backspacing times and 2-gram backspacing times is lower than a second preset value.

In block S208, it is determined whether the sum of all backspacing times is lower than a third preset value. If yes, block S209 is executed, and otherwise, block S211 is executed.

Backspacing can include the 1-gram backspacing and the 2-gram backspacing above, and may further include other gram backspacing. Therefore, the statistic here is total backspacing times of all grams.

The second preset value and the third preset value may be same or difference, for example, both may be selected as 2.

In block S209, it is determined whether a number of consecutive words in the optimum candidate text are greater than a fourth preset value. If no, block S210 is executed, and if yes, block S211 is executed.

For example, the fourth preset value is selected as 3.

In block S210, the optimum candidate text is taken as a corrected result.

In block S211, the speech recognition result to be corrected is held unchanged.

In this embodiment, by performing the phonetic notation on the speech recognition result to be corrected; obtaining the one or more candidate texts according to the pinyin; and determining the optimum candidate text as the corrected result in response to that the optimum candidate text satisfies the preset condition, it may correct the error in the speech recognition result based on the pinyin input method, and improve the accuracy of the corrected result. By judging whether the optimum candidate text satisfies the preset condition, the more accurate corrected result may be obtained.

Figure 4:
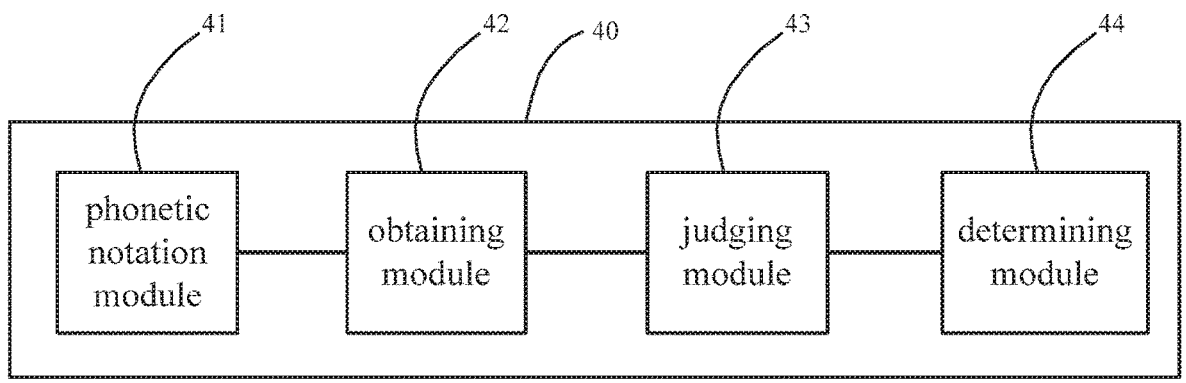
FIG. 4 is a block diagram illustrating a device for correcting an error in a speech recognition result provided in an embodiment of the present disclosure.

FIG. 4 is a block diagram illustrating a device for correcting an error in a speech recognition result provided in an embodiment of the present disclosure.

Referring to FIG. 4, the device 40 of this embodiment includes: a phonetic notation module 41, an obtaining module 42, a judging module 43 and a determining module 44.

The phonetic notation module 41 is configured to perform phonetic notation on a speech recognition result to be corrected to obtain a pinyin corresponding to the speech recognition result.

The obtaining module 42 is configured to obtain one or more candidate texts according to the pinyin, and determine an optimum candidate text from the one or more candidate texts.

The judging module 43 is configured to judge whether the optimum candidate text satisfies a preset condition.

The determining module 44 is configured to determine the optimum candidate text as a corrected result of the speech recognition result to be corrected in response to that the optimum candidate text satisfies the preset condition.

In some embodiments, the obtaining module is specifically configured to: obtain a general language model, obtain a specific language model corresponding to the speech recognition result to be corrected, and obtain the one or more candidate texts based on the general language model, the specific language model and the pinyin.

In some embodiments, the obtaining module is further configured to: determine a suboptimum candidate text from the one or more candidate texts.

In some embodiments, the judging module is specifically configured to: calculate a difference value between a language model scores of the optimum candidate text and the suboptimum candidate text; in response to that the difference is greater than a preset value, obtain a word language model, and mark the optimum candidate text and the speech recognition result to be corrected based on the word language model; in response to that a score corresponding to the optimum candidate text is greater than a score corresponding to the speech recognition result to be corrected, mark the optimum candidate text by using a phase language model, and count backspacing times during marking; in response to that the backspacing times satisfy a time demand, determine whether a number of consecutive words in the optimum candidate text is less than or equal to the preset value; and in response to yes, determine that the optimum candidate text satisfies the preset condition.

Figure 5:
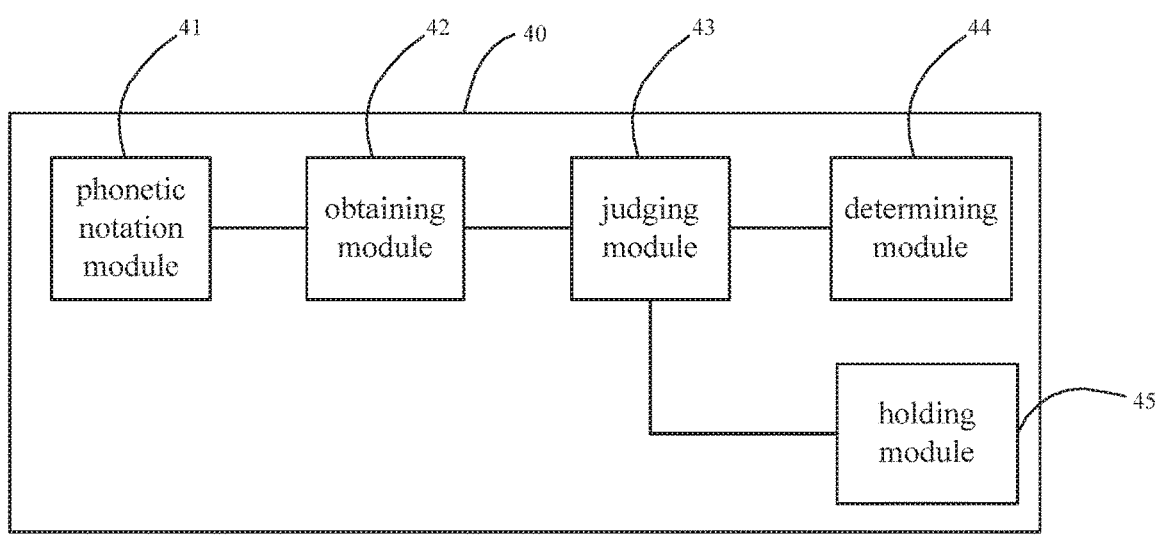
FIG. 5 is a block diagram illustrating a device for correcting an error in a speech recognition result provided in another embodiment of the present disclosure.

In some embodiments, referring to FIG. 5, the device may further include: a holding module 45, configured to hold the speech recognition result to be corrected unchanged in response to that the optimum candidate text does not satisfy the present condition.

It should be understood that, the device of this embodiment corresponds to the method of the above embodiment, and detailed contents may be made with reference to related description of the method embodiments, which is not illustrated in detail herein.

In this embodiment, by performing the phonetic notation on the speech recognition result to be corrected; obtaining the one or more candidate texts according to the pinyin; and determining the optimum candidate text as the corrected result in response to that the optimum candidate text satisfies the preset condition, it may correct the error in the speech recognition result based on the pinyin input method, and improve the accuracy of the corrected result. By judging whether the optimum candidate text satisfies the preset condition, the more accurate corrected result may be obtained.

It should be understood that, the same or similar part in the respective embodiment above may refer to each other. Contents not illustrated in detail in some embodiments may refer to the same or similar contents in other embodiments.

Embodiments of the present disclosure further provide a device, including: a processor; a memory configured to store instructions executable by the processor; in which, the processor is configured to: perform phonetic notation on a speech recognition result to be corrected, to obtain a pinyin corresponding to the speech recognition result; obtain one or more candidate texts according to the pinyin, and determine an optimum candidate text from the one or more candidate texts; judge whether the optimum candidate text satisfies a preset condition; and determine the optimum candidate text as a corrected result of the speech recognition result to be corrected in response to satisfying the preset condition.

Embodiments of the present disclosure further provide a non-transitory computer readable storage medium. When instructions in the storage medium are executed by a processor, the processor may be configured to execute: perform phonetic notation on a speech recognition result to be corrected, to obtain a pinyin corresponding to the speech recognition result; obtain one or more candidate texts according to the pinyin, and determine an optimum candidate text from the one or more candidate texts; judge whether the optimum candidate text satisfies a preset condition; and determine the optimum candidate text as a corrected result of the speech recognition result to be corrected in response to satisfying the preset condition.

Embodiments of the present disclosure further provide a computer program product. When instructions in the computer program product are executed by a processor, the processor may be configured to execute: perform phonetic notation on a speech recognition result to be corrected, to obtain a pinyin corresponding to the speech recognition result; obtain one or more candidate texts according to the pinyin, and determine an optimum candidate text from the one or more candidate texts; judge whether the optimum candidate text satisfies a preset condition; and determine the optimum candidate text as a corrected result of the speech recognition result to be corrected in response to satisfying the preset condition.

It should be understood that, in description of the present disclosure, terms such as "first" and "second" are used for purposes of description and are not understood to indicate or imply relative importance or significance. In addition, in the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it may not be in the order shown or discussed, including executing functions in a substantially simultaneous manner or in an opposite order according to the related functions, which is understood by the skilled in the art that embodiments of the present disclosure belong to.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an application specific integrated circuit having appropriate combinational logic gates, a Programmable Gate Array(s) (PGA), a Field Programmable Gate Array (FPGA), etc.

The common technical personnel in the field may understand that all or some steps in the above embodiments may be completed by the means that relevant hardware is instructed by a program. The program may be stored in a computer readable storage medium, and the program includes any one or combination of the steps in embodiments when being executed.

In addition, respective function units in respective embodiments of the present disclosure may be integrated in a processing unit, and may further exist physically alone, and two or more units may further be integrated in a unit. The foregoing integrated unit may be implemented either in the forms of hardware, and may further be implemented in forms of a software function module. If the integrated module is implemented in a software functional module and is sold or used as a stand-alone product, it may be stored in a computer readable storage medium.

The above-mentioned storage medium may be a ROM (Read only memory), a magnetic disk or a disk and the like.

In the description of the present disclosure, reference terms throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, schematic representations of the above terms are not necessarily referring to the same embodiment or example. Furthermore, the particular features, structures, materials, or characteristics may be combined in any suitable manner in one or more embodiments or examples.

Although embodiments of the present disclosure have been shown and described above. It should be understood that, the above embodiments are exemplary, and it cannot be construed to limit the present disclosure. Those skilled in the art may make changes, alternatives, and modifications in the embodiments within the scope of the present disclosure.

What is claimed is:

1. A method for correcting an error in a speech recognition result, comprising:
    performing, by one or more computing devices, phonetic notation on a speech recognition result to be corrected, to obtain a pinyin corresponding to the speech recognition result;

obtaining, by the one or more computing devices, one or more candidate texts according to the pinyin;
determining, by the one or more computing devices, an optimum candidate text from the one or more candidate texts;
judging, by the one or more computing devices, whether the optimum candidate text satisfies a preset condition; and
determining, by the one or more computing devices, the optimum candidate text as a corrected result of the speech recognition result to be corrected in response to satisfying the preset condition,
wherein the method further comprises: determining, by the one or more computing devices, a suboptimum candidate text from the one or more candidate texts;
wherein, determining whether the optimum candidate text satisfies the preset condition, comprises:
calculating, by the one or more computing devices, a difference value between a language model score of the optimum candidate text and a language model score of the suboptimum candidate text;
in response to that the difference is greater than a first preset value, obtaining, by the one or more computing devices, a word language model, and marking, by the one or more computing devices, the optimum candidate text and the speech recognition result to be corrected based on the word language model;
in response to that a score corresponding to the optimum candidate text is greater than a score corresponding to the speech recognition result to be corrected, marking, by the one or more computing devices, the optimum candidate text by using a phase language model, and counting, by the one or more computing devices, backspacing times during marking;
in response to that the backspacing times satisfy a time demand, determining, by the one or more computing devices, whether a number of consecutive words in the optimum candidate text is less than or equal to a fourth preset value; and
in response to that the number of consecutive words in the optimum candidate text is less than or equal to the fourth preset value, determining, by the one or more computing devices, that the optimum candidate text satisfies the preset condition.

2. The method according to claim 1, wherein, obtaining the one or more candidate texts according to the pinyin, comprises:
obtaining, by the one or more computing devices, a general language model;
obtaining, by the one or more computing devices, a specific language model corresponding to the speech recognition result to be corrected; and
obtaining, by the one or more computing devices, the one or more candidate texts based on the general language model, the specific language model and the pinyin.

3. The method according to claim 1, further comprising:
holding, by the one or more computing devices, the speech recognition result to be corrected unchanged in response to that the optimum candidate text does not satisfy the present condition.

4. The method according to claim 1, further comprising:
determining, by the one or more computing devices, that the backspacing times satisfies the time demand in response to that a sum of unary backspacing times and binary backspacing times is lower than a second preset value, and all backspacing times is lower than the fourth preset value.

5. A device for correcting an error in a speech recognition result, comprising:
a processor;
a memory configured to store instructions executable by the processor; wherein, the processor is configured to:
perform phonetic notation on a speech recognition result to be corrected, to obtain a pinyin corresponding to the speech recognition result;
obtain one or more candidate texts according to the pinyin;
determine an optimum candidate text from the one or more candidate texts;
judge whether the optimum candidate text satisfies a preset condition; and
determine the optimum candidate text as a corrected result of the speech recognition result to be corrected in response to satisfying the preset condition,
wherein the processor is further configured to determine a suboptimum candidate text from the one or more candidate texts,
wherein the processor is configured to determine whether the optimum candidate text satisfies the preset condition by acts of:
calculating, by the one or more computing devices, a difference value between a language model score of the optimum candidate text and a language model score of the suboptimum candidate text;
in response to that the difference is greater than a first preset value, obtaining, by the one or more computing devices, a word language model, and marking, by the one or more computing devices, the optimum candidate text and the speech recognition result to be corrected based on the word language model;
in response to that a score corresponding to the optimum candidate text is greater than a score corresponding to the speech recognition result to be corrected, marking, by the one or more computing devices, the optimum candidate text by using a phase language model, and counting, by the one or more computing devices, backspacing times during marking;
in response to that the backspacing times satisfy a time demand, determining, by the one or more computing devices, whether a number of consecutive words in the optimum candidate text is less than or equal to a fourth preset value; and
in response to that the number of consecutive words in the optimum candidate text is less than or equal to the fourth preset value, determining, by the one or more computing devices, that the optimum candidate text satisfies the preset condition.

6. The device according to claim 5, wherein the processor is configured to obtain the one or more candidate texts according to the pinyin by acts of:
obtaining a general language model;
obtaining a specific language model corresponding to the speech recognition result to be corrected; and
obtaining the one or more candidate texts based on the general language model, the specific language model and the pinyin.

7. The device according to claim 5, wherein the processor is further configured to determine that the backspacing times satisfies the time demand in response to that a sum of unary backspacing times and binary backspacing times is lower than a second preset value, and all backspacing times is lower than the fourth preset value.

8. The device according to claim 5, wherein the processor is further configured to hold the speech recognition result to be corrected unchanged in response to that the optimum candidate text does not satisfy the present condition.

9. A non-transitory computer readable storage medium, wherein, when instructions in the storage medium are configured to be executed by a processor, the processor may be configured to execute:
perform phonetic notation on a speech recognition result to be corrected, to obtain a pinyin corresponding to the speech recognition result;
obtain one or more candidate texts according to the pinyin;
determine an optimum candidate text from the one or more candidate texts;
judge whether the optimum candidate text satisfies a preset condition; and
determine the optimum candidate text as a corrected result of the speech recognition result to be corrected in response to satisfying the preset condition,
wherein the processor is further configured to determine a suboptimum candidate text from the one or more candidate texts,
wherein the processor is configured to determine whether the optimum candidate text satisfies the preset condition by acts of:
calculating, by the one or more computing devices, a difference value between a language model score of the optimum candidate text and a language model score of the suboptimum candidate text;
in response to that the difference is greater than a first preset value, obtaining, by the one or more computing devices, a word language model, and marking, by the one or more computing devices, the optimum candidate text and the speech recognition result to be corrected based on the word language model;
in response to that a score corresponding to the optimum candidate text is greater than a score corresponding to the speech recognition result to be corrected, marking, by the one or more computing devices, the optimum candidate text by using a phase language model, and counting, by the one or more computing devices, backspacing times during marking;
in response to that the backspacing times satisfy a time demand, determining, by the one or more computing devices, whether a number of consecutive words in the optimum candidate text is less than or equal to a fourth preset value; and
in response to that the number of consecutive words in the optimum candidate text is less than or equal to the fourth preset value, determining, by the one or more computing devices, that the optimum candidate text satisfies the preset condition.

10. The non-transitory computer readable storage medium according to claim 9, wherein the processor is configured to obtain the one or more candidate texts according to the pinyin by acts of:
obtaining a general language model;
obtaining a specific language model corresponding to the speech recognition result to be corrected; and
obtaining the one or more candidate texts based on the general language model, the specific language model and the pinyin.

11. The non-transitory computer readable storage medium according to claim 9, wherein the processor is further configured to determine that the backspacing times satisfies the time demand in response to that a sum of unary backspacing times and binary backspacing times is lower than a second preset value, and all backspacing times is lower than the fourth preset value.

12. The non-transitory computer readable storage medium according to claim 9, wherein the processor is further configured to hold the speech recognition result to be corrected unchanged in response to that the optimum candidate text does not satisfy the present condition.

* * * * *